(12) United States Patent
Stevenson et al.

(10) Patent No.: US 8,093,991 B2
(45) Date of Patent: Jan. 10, 2012

(54) RFID DETECTION AND IDENTIFICATION SYSTEM FOR IMPLANTABLE MEDICAL DEVICES

(75) Inventors: Robert A. Stevenson, Santa Clarita, CA (US); Geddes Frank Tyers, Vancouver, CA (US); Buehl E. Truex, Glendora, CA (US); Barry C. Muffoletto, Alden, NY (US); Joseph Spaulding, Williamsville, NY (US); Scott W. Kelley, Woodland Hills, CA (US); Christine A. Frysz, Orchard Park, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 12/817,471

(22) Filed: Jun. 17, 2010

(65) Prior Publication Data

US 2011/0063088 A1     Mar. 17, 2011

Related U.S. Application Data

(60) Provisional application No. 61/243,095, filed on Sep. 16, 2009.

(51) Int. Cl.
*H04Q 1/00* (2006.01)

(52) U.S. Cl. ..................... 340/10.4; 340/10.1

(58) Field of Classification Search .................. 340/10.1, 340/572.7; 607/36, 32, 57, 60, 116; 600/309; 29/889.61; 370/231; 343/788
See application file for complete search history.

(56) References Cited

U.S. PATENT DOCUMENTS

| | | | | |
|---|---|---|---|---|
| 2,302,229 | A * | 11/1942 | Lampton | 29/889.61 |
| 5,767,789 | A * | 6/1998 | Afzali-Ardakani et al. | 340/10.1 |
| 6,417,626 | B1 * | 7/2002 | Brcka et al. | 315/111.51 |
| 7,174,212 | B1 * | 2/2007 | Klehn et al. | 607/36 |
| 7,256,695 | B2 * | 8/2007 | Hamel et al. | 340/572.1 |
| 7,262,701 | B1 * | 8/2007 | Nguyen | 340/572.7 |
| 2002/0185229 | A1 * | 12/2002 | Brcka et al. | 156/345.48 |
| 2006/0050638 | A1 * | 3/2006 | Meyer et al. | 370/231 |
| 2006/0212096 | A1 * | 9/2006 | Stevenson | 607/60 |
| 2009/0009418 | A1 * | 1/2009 | Masin et al. | 343/788 |
| 2009/0221885 | A1 * | 9/2009 | Hall et al. | 600/309 |
| 2009/0312835 | A1 | 12/2009 | Stevenson | |

* cited by examiner

*Primary Examiner* — Brian Zimmerman
*Assistant Examiner* — Kaleria Knox
(74) *Attorney, Agent, or Firm* — Michael F. Scalise (57) ABSTRACT

An RFID tag is disposed within a hermetically sealed housing of an IMD. Low frequency RFID interrogators and tags are used, and the housing walls are made of materials, and/or are reduced in thickness, to facilitate RF communication between the RFID tag and an RFID reader/interrogator programmer. An RFID reader/interrogator may be used which has a limited transmit time and time-out period to avoid interference with the operation of the IMD.

17 Claims, 9 Drawing Sheets

RFID DETECTION AND IDENTIFICATION SYSTEM FOR IMPLANTABLE MEDICAL DEVICES

BACKGROUND OF THE INVENTION

The present invention generally relates to RFID interrogation systems and the ability to communicate with RFID tags associated with implantable medical devices (IMDs). More particularly, the present invention is directed to systems and methods for communicating with an RFID tag which is disposed in the hermetically sealed housing or can of the IMD.

There are known in the art various methods for identifying implanted medical devices. One such method is the use of X-ray identification tags encapsulated within header blocks of pacemakers or implantable cardioverter defibrillators (ICD). Such X-ray identification tags can be read on an X-ray of the implanted device and provide information to the physician. The information so provided is limited due to space and typically includes only the manufacturer and model number of the implanted device.

It would be beneficial if physicians were able to obtain additional information about an implanted device and/or a patient from an implanted identification tag. Such information would preferably include, in addition to the manufacturer and model number of the device, the serial number of the device, the date of manufacture, the treating physician's name and contact information and, if authorized by the patient, the patient's name, contact information, medical condition and treatment, and other relevant information concerning device programmed parameters and the like. There are many potential benefits from being able to determine the specific model and serial number and additional related device or patient information from an implanted medical device. For example, product recalls are an increasingly complex and extensive problem and the ability to rapidly identify the precise model and serial number of an implanted product may be life-saving. Cost savings for the involved company may also be substantial.

Currently, most implantable medical device (IMD) patients carry some sort of identification. This could be in the form of a card carried in the wallet or an ID bracelet indicating, for example, that they are a pacemaker wearer of a certain model and serial number. However, such forms of identification are often not reliable. It is quite common for an elderly patient to be presented at the emergency room (ER) of a hospital without his or her wallet and without wearing or carrying any type of a bracelet or other identification. In addition, there have been a number of situations where the patient (due to dementia or Alzheimer's, etc.) cannot clearly state that he or she even has a pacemaker.

Oftentimes the ER physician will palpate the patient's chest and feel that there is an implanted device present. If the patient is comatose, has low blood pressure, or is in another form of cardiac distress, this presents a serious dilemma for the physician. At this moment in time, all that the physician knows is that the patient has some sort of an IMD implant. It could be a pacemaker, a cardioverter defibrillator, or even a vagus nerve stimulator, deep brain stimulator, or some other type of a growing range of passive and active IMDs. What happens next is both laborious and time consuming. The ER physician will have various manufacturers' cardiac rhythm management device (CRMD) programmers transported from the hospital pacemaker and ICD follow-up clinic or other site down to the ER. ER personnel will then try to interrogate the implantable medical device to see if they can determine what it is. For example, they might first try to use a Medtronic programmer to see if it is a Medtronic pacemaker. Then they might try a St. Jude, a Guidant, an ELA, a Biotronik or one of a number of other programmers that may be available. If none of those programmers work, then the ER physician has to consider that the implanted device may be a neurostimulator and try to locate a Cyberonics or Neuropace programmer.

It would be a great advantage and potentially lifesaving if the ER physician could very quickly identify the type of implant and model number. In certain cases, for example, with a pacemaker patient who is in cardiac distress, with an external programmer the physician could boost the pacemaker output voltage to properly recapture the heart, obtain a regular rhythm and stabilize blood pressure. All of the lost time running around to find the right programmer, however, may greatly delay or preclude this. Accordingly, there is a need for a way to rapidly identify the type and model number of an active implantable medical device so that the proper external programmer for it can be rapidly identified and obtained.

RFID tag implants have been previously used in animals for pet tracking. They have also been used in the livestock industry. For example, RFID tags have been placed in cattle to identify them and track certain information. However, the primary problem with using such prior devices in humans has to do with the fact that none of the current RFID tags have been designed to have long term reliability and biocompatibility within the body fluid environment. Methods used, include encapsulating an RFID tag in plastic or placing the RFID tag in a plastic or glass tube with an epoxy infill. However, none of these materials provide a truly hermetic seal against body fluids.

Accordingly, there is a need to identify and communicate with implanted IMDs. RFID tags can be used to communicate with IMDs and provide information relating to the IMD. However, there is a need for placing the RFID in a hermetically sealed environment to both protect the RFID tag as well as the patient. The present invention fulfills these needs and provides other related advantages.

SUMMARY OF THE INVENTION

The present invention relates to an RFID detection and identification system comprising: (1) an implantable medical device (IMD) having a hermetically sealed housing for preventing entry of body fluids into the IMD; (2) an RFID tag disposed within the IMD housing; and (3) a radio frequency (RF) transmissive window or wall of the IMD housing adjacent to the RFID tag, for facilitating RF communication between the RFID tag and an external RF interrogator. In one preferred embodiment, the IMD housing forms an electromagnetic shield having a first wall thickness, and the RF transmissive window comprises a portion of the electromagnetic shield but has a reduced second wall thickness. In illustrated embodiments, the second wall thickness is one-half or less of the first wall thickness, typically on the order of 0.005 inches or less. If desired, the IMD housing may be filled with a non-conductive fluid or gel.

A recess is provided in the IMD housing adjacent to the RF transmissive window, in which at least a portion of the RFID tag is disposed. An exterior wall of the IMD housing may comprise a protrusion adjacent to the recess or, alternatively, a flush and uniform surface over and adjacent to the recess. The recess and the transmissive window may be formed by punching a portion of the wall of the IMD housing to form the inner recess, and then reducing the thickness of the punched-out portion of the wall to form the RF transmissive window. The thickness of the punched-out portion of the wall is reduced by grinding or pressing. The RF transmissive window may comprise a Grade 5 or Grade 23 titanium, alloys of stainless steel (stainless steel alloy 316 or Haynes 25), or a hermetic ceramic or related non-metallic material.

Alternatively, the RF transmissive window may comprise a window plug inserted into an aperture of the IMD housing wall. Here, the window plug typically comprises a thinner metallic material or a more RF transmissive material compared with the remainder of the IMD housing, such as a hermetic ceramic or related non-metallic material. A ferrule may be disposed between the window plug and the IMD housing wall to facilitate attachment of the RF transmissive window to the IMD housing wall.

In alternate embodiments, either the entire IMD housing or a substantial portion thereof may be comprised of an RF transmissive material such as a hermetic ceramic or related non-metallic material. The RF transmissive portion of the housing is interiorly lined with a thin electric shield to protect the internal IMD electronics from stray EMF signals, which shield would not interfere with or impede RF communication between an internal RFID chip and an external interrogator. In one illustrated embodiment, both halves of the IMD housing are comprised of an alumina ceramic material having a thin interior electric shield, and in another embodiment one-half of the IMD housing is comprised of an alumina ceramic material, which half is joined to a second clam-shell housing portion constructed of titanium.

The RFID tag may comprise a typical RFID chip adhered to an underlying substrate, or an RFID chip having an antenna wrapped around an elongated ferrite metal core. In this latter instance, an end of the ferrite metal core is disposed adjacent to the RF transmissive window. Moreover, the RFID tag may comprise an RFID chip having dual antennas so that the RFID chip can be accessed from either side of the IMD.

The RF interrogator may have a limited transmit time and an associated time-out period.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention is related to systems and methods for providing RFID tags in a hermetically sealed manner so that a physician or other medical professional can identify and communicate with the RFID tag and ascertain information regarding the implanted medical device (IMD), patient, etc.

Figures 1, 2:
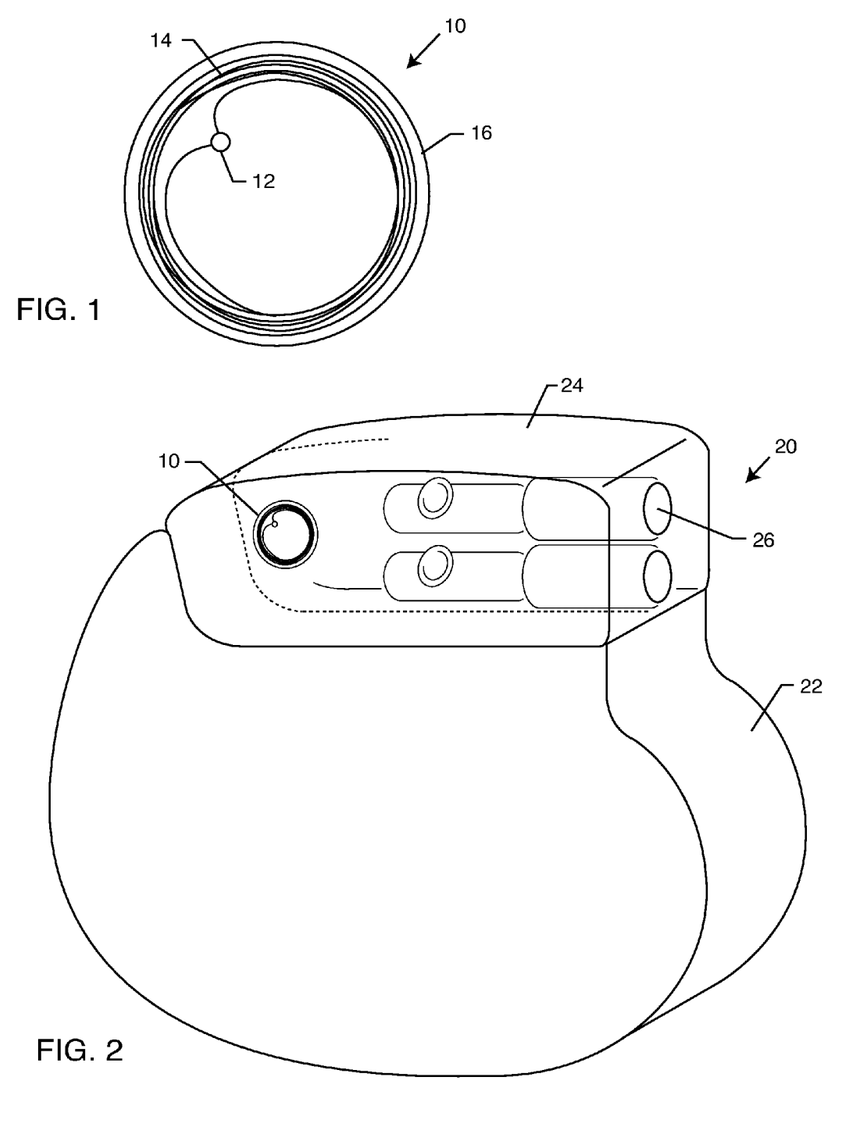
FIG. 1 is a schematic view of a typical RFID tag.
FIG. 2 is a perspective and somewhat schematic illustration of an implantable medical device (IMD) having an RFID tag embedded within a header block thereof.

With reference now to FIG. 1, an exemplary prior art RFID tag 10 is shown. The RFID tag 10 includes a chip 12 which contains memory, and other electronic components and circuits necessary to store, send, and in some cases receive and store data in volatile memory. An antenna 14 is operably connected to the chip 12, and the chip 12 and antenna 14 are typically supported by a substrate or base 16. Such RFID tags are well known in the art.

With reference now to FIG. 2, an IMD 20 is illustrated. In this case, the IMD 20 is a pacemaker or implantable cardioverter defibrillator (ICD). However, the present invention is also applicable to all other types of medical devices planted inside or outside the human body. The IMD 20 includes a housing or can 22 which is typically comprised of titanium or other metal and which is hermetically sealed and contains various electronic components of the IMD (not shown). A header block 24 is attached to the housing 22 and contains socket(s) 26 for removable attachment of lead wires and the like which extend from the IMD 20 to the desired location in the patient's body to obtain data, deliver signals or electricity, etc. as is well known in the art. Typically, the header block 24 is comprised of a non-metallic material.

There are four main frequency bands that are now dominating the worldwide RFID industry; namely, low frequency (LF) which generally ranges from 125 to 150 kHz, high frequency (HF) which is at 13.56 MHz, very high frequency (VHF) which is at 433 MHz, and ultra high frequency (UHF) which generally operates at 915 MHz. Moreover, there are both national (American) and international standards (ISO) defining the modulation protocols and pulse widths and repetition rates so that standardized RFID tags can be read by a wide variety of readers.

All of these frequency bands (LF, HF, VHF, and UHF) can penetrate through the non-metallic header block 24. Thus, it would seem to be prudent to place the RFID tag 10 in the header block 24, as illustrated in FIG. 2. However, the header block 24 is not hermetically sealed. That is, body fluids, over time, can penetrate into the header block 24. It has been shown that RFID tags exposed to electrolyte fluids, such as body fluids, will form dendrites and eventually malfunction and fail. Another concern is that the RFID tag 10 is comprised of materials, such as lead, which can leech out and harm the patient. Thus, placement of the RFID tag 10 into the header block 24 of the IMD, such as pacemakers and ICDs, is not optimal.

Since the housing or can 22 of the IMD is hermetically sealed, it would be advantageous if one could place the RFID tag 10 inside the hermetically sealed housing 22 of the IMD 20. However, there are some practical considerations when designing an RFID tag to be inserted into a housing or can 22 of an IMD 20. For example, at UHF, the wavelength is so short that much of the signal from the RFID reader is either absorbed or attenuated by body tissues. RFID signals in the VHF and HF wavelength ranges also present similar drawbacks, although to a lesser degree. Also, for example in a cardiac pacemaker, the titanium housing acts as a very effective electromagnetic shield. In the days when pacemakers were sensitive to microwave ovens, for example, they did not have such overall electromagnetic shields. The advent of these electromagnetic shields combined with feedthrough EMI filters (capacitors) has generally made IMDs resistant to the fields from microwave ovens, airport radars, closely-held cell phones and the like. IMDs are typically encased in an overall electromagnetic shield consisting of titanium, stainless steel or other suitable biocompatible material. While protecting the sensitive electronics from high frequency signals, such as from microwave ovens, airport radars, cell phones and the like, this also prevents UHF, VHF and HF signals from an RFID communicator from effectively penetrating the electromagnetic shielded housing of a typical IMD.

The present invention is directed to associating either an LF (low frequency) or HF (high frequency) tag within the housing 22 of an IMD 20. LF is highly preferred since an LF tag could be placed inside the sealed titanium housing of the IMD. Such low frequencies and long wavelengths of signals from LF readers readily penetrate body tissue as if it were not there. Moreover, LF frequencies will also penetrate non-magnetic metals, such as titanium and stainless steel.

For all the reasons stated above RFID tags in the LF frequency ranges are a much better choice compared to HF, VHF or UHF (or higher) because LF frequencies penetrate the human body and/or IMD polymer header or under specific conditions, the metallic titanium or stainless steel housing of an IMD effectively.

The skin depth or depth of penetration through a nonferrous metal of a LF frequency has also been found by the inventors to be related to the electrical resistivity of the material. For example, Grade 1 and Grade 2 titanium is not very well penetrated by LF reader fields. On the other hand, grades of titanium, such as Grade 5 and Grade 23, which have relatively high electrical resistivities, are readily penetrated by LF reader signals. Alloys of stainless steel, including Alloy 316 and Haynes 25 are intermediate between titanium Grade 1 and titanium Grade 23. LF reader signals tend to adequately penetrate these grades of stainless steel.

Figure 3:
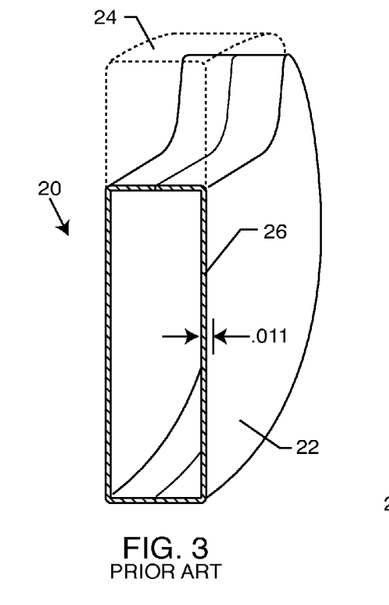
FIG. 3 is a partially sectioned view of a typical prior art IMD housing.

With reference now to FIG. 3, the thickness of the metallic housing is also important so that the LF signal will readily penetrate the housing of, for example, a cardiac pacemaker. FIG. 3 illustrates a housing or can 22 of an IMD 20, such as a pacemaker or ICD, wherein the arrows represent a housing wall thickness which would be conventional, such as 0.011 inches in thickness. However, at least one of the walls 26 of the housing 22 could be made much thinner, such as 0.005 inches in thickness, so that the LF signal can readily penetrate therethrough and into the IMD 20 so as to communicate with an RFID tag 10 placed therein. It is desirable to have the housing 22 as thin as possible in the area of the RFID tag 10 so that the tag can receive adequate energy from the RFID reader and produce a return pulse.

One way that the walls 26 of the housing 22 can be made sufficiently thin without comprising the structural integrity and strength of the housing can 22 is through a fluid fill, wherein the housing 22 is filled with a non-conductive fluid. Such is disclosed in US 2009-0312835 A1, the contents of which are incorporated herein by reference.

Figure 4:
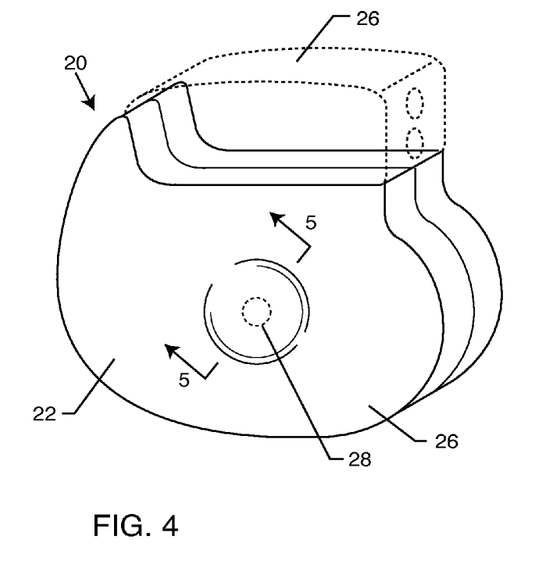
FIG. 4 is a perspective view of an IMD having a modified housing in accordance with the present invention.
Figure 5:
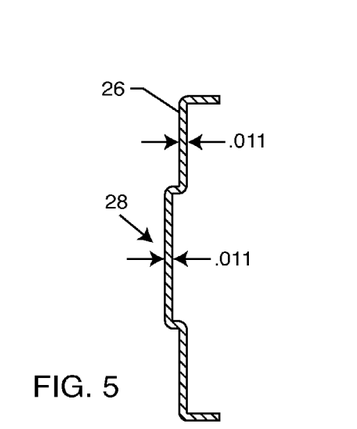
FIG. 5 is a cross-sectional view taken generally along line 5-5 of FIG. 4, illustrating a pressed-out section of the housing wall prior to having the pressed-out section reduced in cross-section, in accordance with the present invention.
Figure 6:
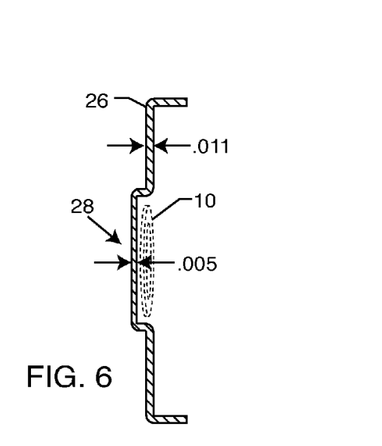
FIG. 6 is a cross-sectional view similar to FIG. 5, but with the pressed out section of the wall being pressed or ground down to a thinner thickness, in accordance with the present invention.

With reference now to FIGS. 4-6, another method of reducing the thickness of the housing wall 26 of the can 22 of the IMD 20 is shown. As illustrated in FIGS. 4 and 5, an area 28, preferably slightly larger than the RFID tag 10 is punched slightly outwardly from the remainder of the wall 26 of the housing can 22, as illustrated in FIG. 5. In this case, the wall 26 has a conventional thickness, such as 0.011 inches. The area 28 which has been pressed outwardly is then pressed or ground down to a thinner thickness, such as 0.005, as illustrated in FIG. 6. Thus, the majority of the housing can 22 will be of such a thickness so as to present an electromagnetic shield or barrier, whereas only the portion 28 immediately adjacent to the RFID tag 10 will be of a lesser thickness, so as to facilitate the transmission of the RFID reader signals and RFID tag signals through the thinner wall portion 28. Typically, the RFID tag 10 would be disposed adjacent to the thinner wall section 28, as illustrated in FIG. 6.

Figure 7:
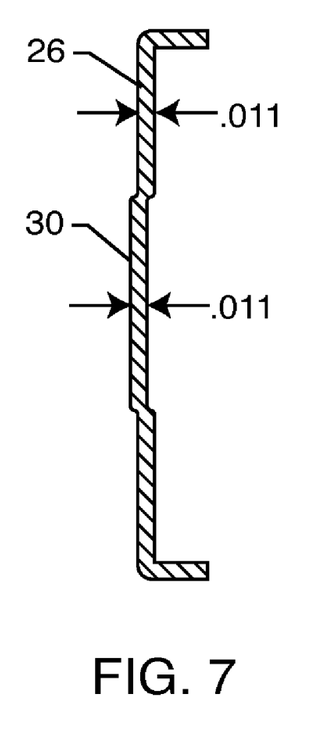
FIG. 7 is a cross-sectional view of a wall of a housing of an IMD similar to FIG. 5, illustrating an alternative configuration.
Figure 8:
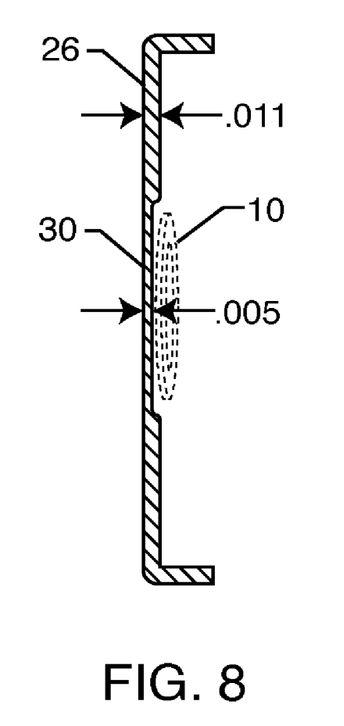
FIG. 8 is a cross-sectional view similar to FIG. 6, illustrating the manner in which the pressed-out portion of the wall shown in FIG. 7 may be thinned to present a uniform outer wall for the IMD housing.

FIGS. 7 and 8 illustrate a similar concept, but wherein the wall 26 of the housing can 22 is retained generally flush and uniform on the exterior thereof, instead of having a protruding area 28, as illustrated in FIGS. 4-6. In this case, as illustrated in FIG. 7, a portion 30 of the housing can wall 26 is pressed outward, similar to FIGS. 5 and 6, but not to the same degree. The entire wall 26 thickness at this point remains at 0.011 inches. However, the slightly protruding portion of area 30 is pressed or ground down so that it is flush with the remainder of wall 26. Nevertheless, the wall thickness at area 30 is reduced, such as to 0.005 inches, as illustrated in FIG. 8.

Figure 9:
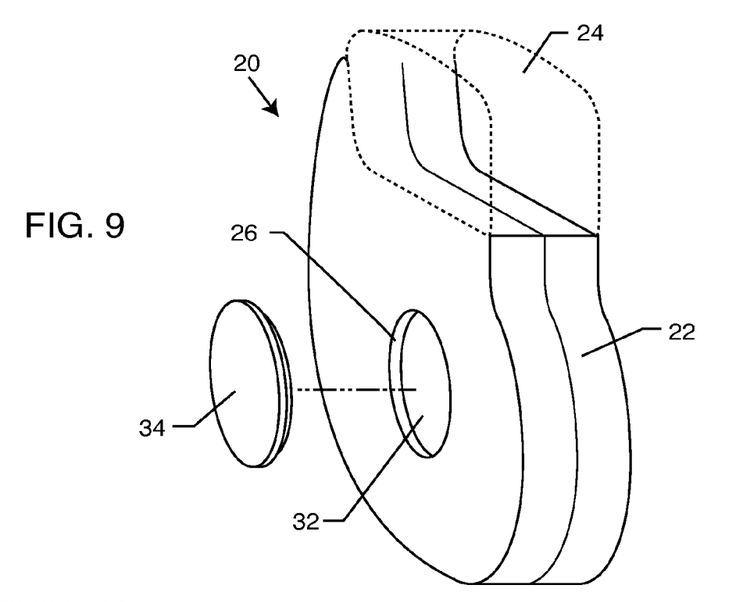
FIG. 9 is a perspective and partially exploded view of an IMD housing having a window-plug, in accordance with the present invention.
Figure 10:
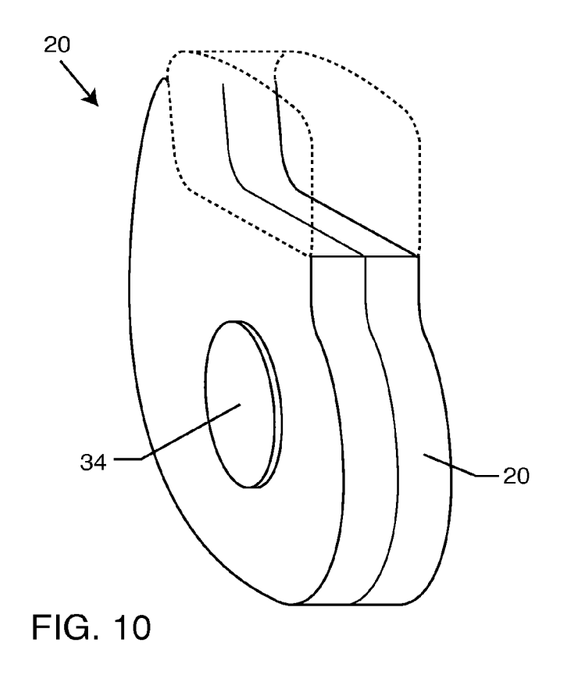
FIG. 10 is a perspective view similar to FIG. 9, illustrating the window-plug attached to the housing of the IMD.

With reference now to FIGS. 9 and 10, yet another method for reducing the thickness of a portion of the housing wall, or providing a more transmissive material at a portion of the housing 22 is illustrated. In this case, an aperture 32 is formed within the wall of the housing 22. The RFID tag is placed within the housing 22 adjacent to the aperture 32. A window plug 34 is then used to close the aperture 32, as illustrated in FIG. 10. The window plug 34 can be thinner than the wall 26 of the housing 22, or comprised of a more transmissive metal, ceramic or other material. The window plug 34 can be attached to the housing 22 by any known means, such as welding, brazing or the like to create a hermetic seal.

Figure 11:
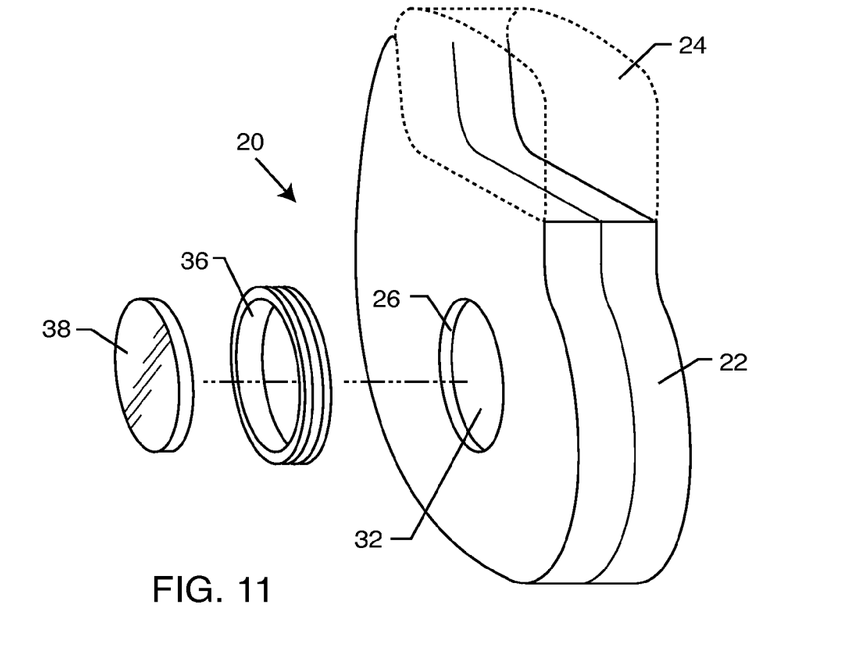
FIG. 11 is a perspective view similar to FIG. 9, but utilizing a ferrule.
Figure 12:
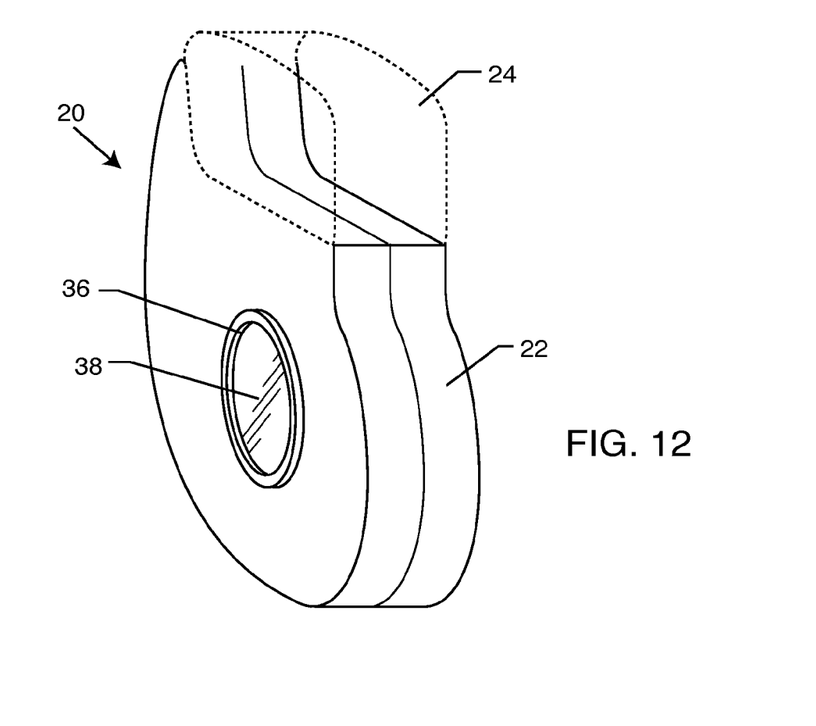
FIG. 12 is a perspective view similar to FIG. 11, illustrating the window-plug and ferrule attached to the IMD housing.

With reference now to FIGS. 11 and 12, a similar embodiment is shown wherein a ferrule 36 is inserted into the aperture 32 so as to engage the wall 26, and the window plug 38 is subsequently attached to the ferrule 36 by known means, such as welding or the like. Once again, the window plug 38 is comprised of a thinner metallic material or a more transmissive material at the desired frequency range.

Figure 13:
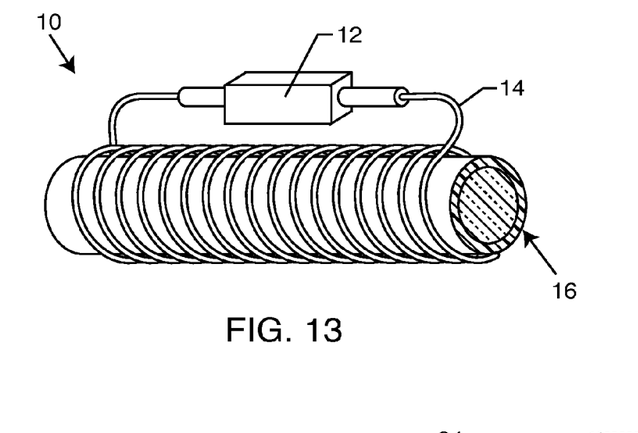
FIG. 13 is a perspective view of another type of RFID tag, in comparison with FIG. 1.

With reference now to FIG. 13, another type of RFID tag 10 is shown, in comparison to that illustrated in FIG. 1, which comprises a chip 12 having an antenna 14 wrapped around a length of an elongated ferrite metal core 16. Such an arrangement effectively increases the ability of the antenna 14 to receive and relay data signals. This is particularly the case at the opposite ends of the ferrite metal core 16.

This RFID tag 10 can be disposed within the housing or can 22 of the IMD 20 in such a manner that the opposite ends of the ferrite core 16 face the thinner wall area 28 or 30 of the housing can 22 or the window plug 34 or 38, so as to transmit more easily therethrough. Of course, this arrangement could also be used in association with a housing can 22 having an overall thinner wall 26 or oppositely disposed RF transmissive windows or walls of the IMD housing.

Figure 14:
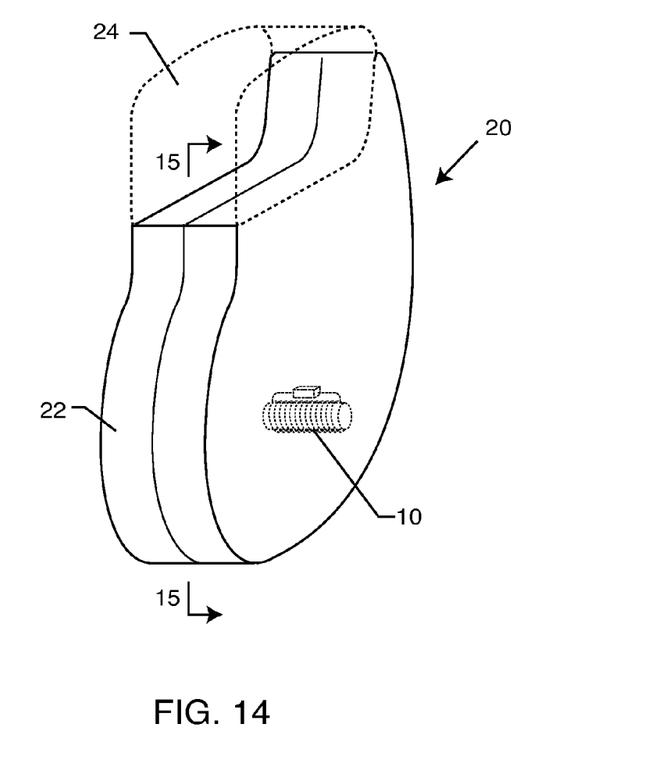
FIG. 14 is a perspective view of an IMD, illustrating the RFID tag of FIG. 13 disposed therein, in accordance with the present invention.
Figure 15:
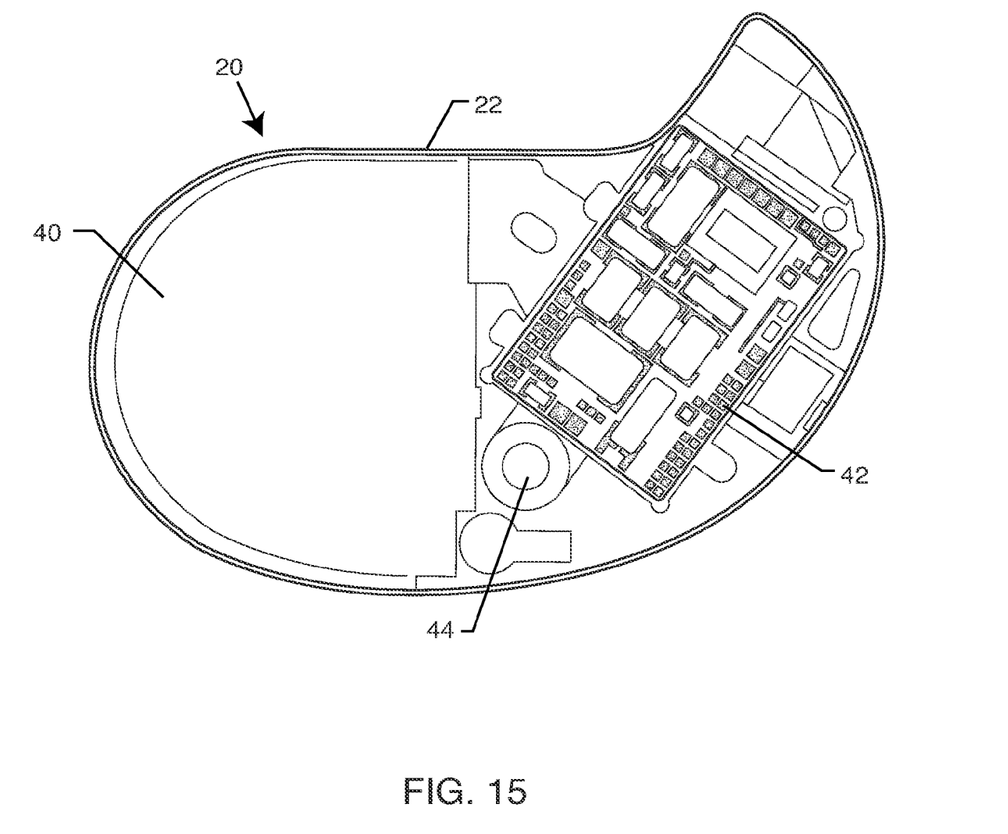
FIG. 15 is a sectional view of an IMD taken generally along the line 15-15 in FIG. 14.

With reference now to FIGS. 14 and 15, in at least one pacemaker, the design is such that the housing or can 22 has an area reserved for the battery or power pack 40, and a dedicated area for the placement of the circuit board 42, with associated electronic components, sensors, etc. Each half or clamshell of the housing 22, which are later welded to one another, includes a recessed/socket circular area 44, as shown in FIG. 15, into which an end of the ferrite core 16 of the RFID tag of FIG. 13 can be inserted, such that the RFID tag can be positioned within the IMD as illustrated in FIG. 14. This would place the ends of the ferrite core 16 immediately adjacent to the opposite walls of the housing can 22, so as to facilitate receipt and transmissions of signals.

Figure 16:
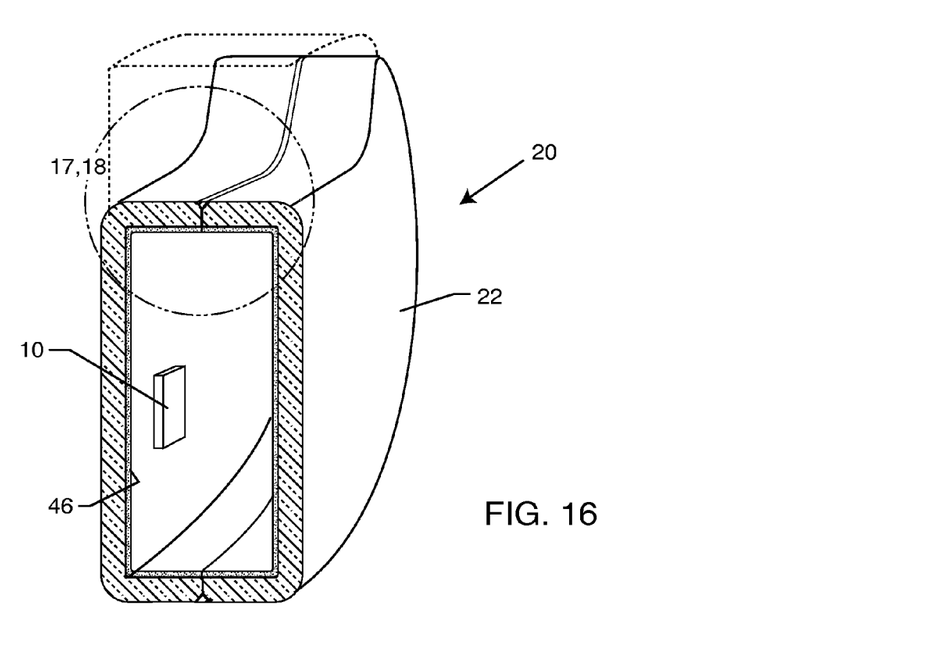
FIG. 16 is a partial sectional view similar to FIG. 3, but illustrates yet another form of the invention wherein the IMD housing is comprised of a hermetic ceramic or related non-metallic material.

With reference to FIG. 16, an alternative embodiment of the present invention is shown. Here, both halves of the housing 22 for the IMD comprise an RF transmissive material such as a hermetic ceramic or a related non-metallic material. At once, one will notice that the wall thickness of the housing or can 22 is thicker than that required for a titanium housing such as shown in FIG. 3. In order to protect internal electronic components of the IMD 20, the interior surface of the housing or can 22 is lined with a thin electric shield 46. Typically the shield is formed of a copper or gold material that may be plated to the alumina ceramic housing, vapor deposited, chemical vapor deposited, or sputtered to the internal surface. This gold or copper shield 46, while protecting the sensitive electronic components often found within the IMD 20 from stray EMF signals, does not interfere or minimally impedes the transmission of RF signals between the RFID tag 10 and an external interrogator. Notably, the RFID tag 10 may be provided with dual antennas on either side of the chip so as to facilitate communication with the RFID tag from either side of the IMD 20.

Figure 17:
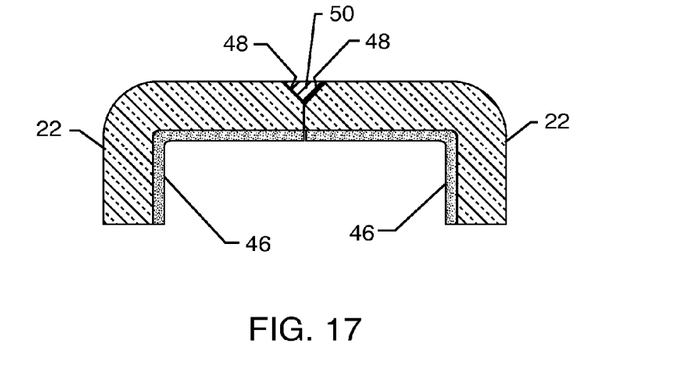
FIG. 17 is an enlarged sectional view taken generally of the area indicated by line 17-17 from FIG. 16.

FIG. 17 illustrates one preferred way of attaching the two alumina ceramic halves of the housing or can 22 to one another. In this instance, the facing surfaces of the housing would each be provided with a notch 48 which is metalized such as by a sputter or vapor deposition process. These metalized surfaces 48 are then adhered to one another by means of a suitable braze or laser weld 50.

Figure 18:
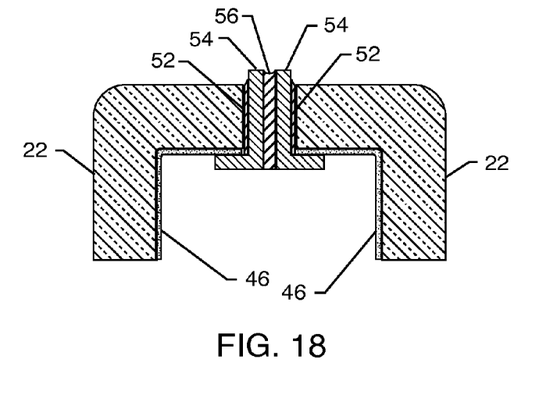
FIG. 18 is an enlarged sectional view similar to FIG. 17, illustrating an alternative way of hermetically sealing the two hermetic ceramic IMD housing halves together.

As shown in FIG. 18, an alternative way of attaching the two alumina ceramic housing sections 22 to one another is to apply metallization 52 to opposing surfaces and then braze or attach a titanium ferrule 54 to those surfaces. The two ferrules 54 are then laser welded 56 to one another to form a hermetic and biocompatible attachment and seam between the two IMD housing halves 22.

It will be appreciated that the embodiments of FIGS. 16-18 provide an IMD 20 wherein substantially the entire enclosure of the housing 22 is RF transmissive to facilitate communication with the RFID tag 10.

Figure 19:
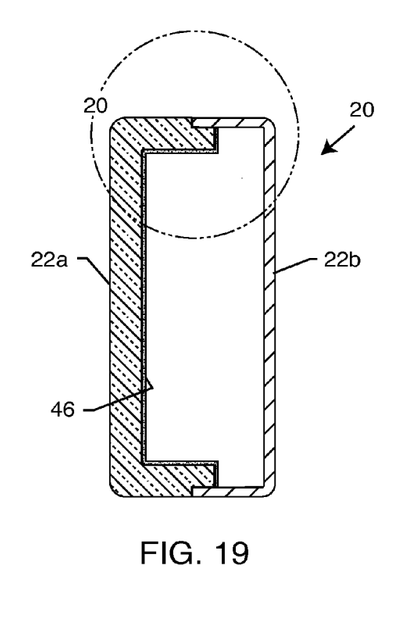
FIG. 19 is a partial sectional view similar to FIG. 16, illustrating another embodiment of the invention where one half of the IMD housing comprises a hermetic ceramic or related non-metallic material, and the other half comprises a traditional titanium material.
Figure 20:
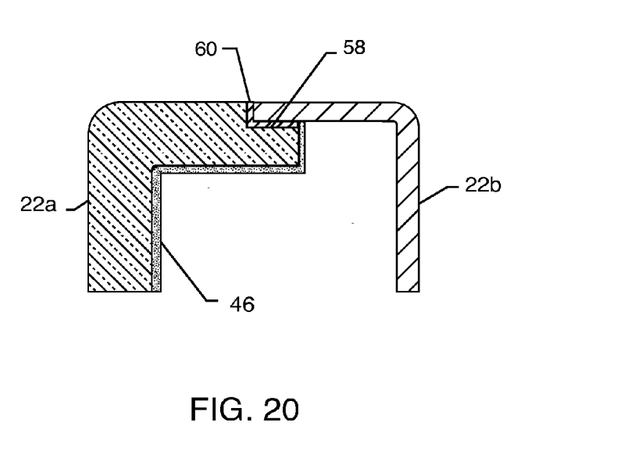
FIG. 20 is an enlarged sectional view of the area indicated by the line 20-20 from FIG. 19.

FIGS. 19 and 20 illustrate a hybrid IMD 20 having one half of the housing 22 of FIG. 16 with any of the other housings illustrated herein. In this case, an alumina ceramic housing half 22a is joined to a titanium housing half 22b. As discussed above, the internal surface of the ceramic housing half 22a is lined with a thin electric shield 46. Referring to FIG. 20, the peripheral surface of the housing half 22a is metalized at 58 so that a suitable hermetic seal attachment 60 may be made between the two housing halves 22a and 22b.

The RFID tag and arrangement of the present invention may be used in conjunction with an RFID reader/interrogator/communicator which operates at a low frequency but which has been modified to have a limited transmit time and an associated time-out period. It has been found that an RFID reader/interrogator having a limited transmit time and a time-out period will prevent unwanted and adverse reaction by the IMD to such signals as there is a built-in delay to charge up capacitors and a subsequent check of signals before discharging the capacitors and shocking the patient. U.S. patent application Ser. No. 12/566,490 is incorporated by reference herein.

The present invention applies to identification of implantable medical devices, such as a cardiac pacemaker, an implantable defibrillator, a congestive heart failure device, a hearing implant, a cochlear implant, a neurostimulator, carotid sinus stimulator or other hypertension control device, a drug pump, a ventricular assist device, an insulin pump, a spinal cord stimulator, an implantable sensing system, a deep brain stimulator, an artificial heart, an incontinence device, a vagus nerve stimulator, a bone growth stimulator, a gastric pacemaker, a Bion, or a prosthetic device and component parts thereof, including active leads and/or abandoned leads.

Accordingly, it will be appreciated that the present invention relates to an RFID detection and identification system which comprises an active implantable medical device (IMD) having a hermetically sealed housing for preventing entry of body fluids into the IMD, an RFID tag disposed within the IMD housing, and a radio frequency (RF) transmissive window or wall of the IMD housing adjacent to the RFID tag for facilitating RF communication between the RFID tag and an RF interrogator.

Although several embodiments have been described in detail for purposes of illustration, various modifications may be made without departing from the scope and spirit of the invention.

What is claimed is:

1. An RFID detection and identification system, comprising:
   a) an implantable medical device (IMD) having a hermetically sealed housing for preventing entry of body fluids into the IMD;
   b) an RFID tag disposed within the IMD housing; and
   c) a radio frequency (RF) transmissive window or wall of the IMD housing adjacent to the RFID tag, wherein the window or wall is of alumina, and at least a portion of the alumina is contacted by an electromagnetic shield so that the shielded portion of the window or wall is penetratable by low frequency (LF) signals ranging from 125 kHz to 150 kHz to thereby facilitate radio frequency (RF) communication between the RFID tag and an RF interrogator through the window or wall.

2. The system of claim 1 wherein the IMD housing is filled with a non-conductive material.

3. The system of claim 2, wherein the nonconductive material comprises a fluid or a gel material.

4. The system of claim 1 wherein the RF transmissive window comprises a window plug inserted into an aperture in the IMD housing wall.

5. The system of claim 4, wherein the window plug comprises a thinner material compared with the remainder of the IMD housing.

6. The system of claim 4, including a ferrule disposed between the window plug and the IMD housing wall.

7. The system of claim 1 wherein the RFID tag comprises an RFID chip having an antenna wrapped around a ferrite metal core.

8. The system of claim 7, wherein an end of the ferrite metal core is disposed adjacent to the RF transmissive window.

9. The system of claim 1 wherein the RFID tag comprises an RFID chip having dual antennas.

10. The system of claim 1 wherein the shielded window or wall portion has a thickness of 0.005 inches or less.

11. The system of claim 1 wherein the electromagnetic shield is of either copper or gold coated over the alumina.

12. An RFID detection and identification system, comprising:
   a) an implantable medical device (IMD) having a hermetically sealed housing for preventing entry of body fluids into the IMD;
   b) an RFID tag disposed within the IMD housing; and
   c) a radio frequency (RF) transmissive window or wall of the IMD housing adjacent to the RFID tag, wherein the window or wall is of an alumina ceramic having an electromagnetic shield of either copper or gold adjacent to at least a portion thereof, and
   d) wherein the ceramic window or wall provided with the electromagnetic shield is penetratable by low frequency (LF) signals to thereby provide for radio frequency (RF) communication between the RFID tag and an RF interrogator through the window or wall.

13. The system of claim 12 wherein the electromagnetic shield is characterized as having been contacted to the alumina window or wall by a process selected from the group consisting of plating, vapor deposition, chemical vapor deposition, and sputtering.

14. The system of claim 1 wherein the electromagnetic shield is characterized as having been contacted to the alumina window or wall by a process selected from the group consisting of plating, vapor deposition, chemical vapor deposition, and sputtering.

15. A housing for an implantable medical device (IMD), the housing comprising:
   a) a window or wall of the housing being of alumina,
   b) wherein at least a portion of the window or wall is contacted by an electromagnetic shield so that the shielded portion of the window or wall is penetratable by low frequency (LF) signals ranging from 125 kHz to 150 kHz.

16. The housing of claim 15 wherein the electromagnetic shield is of either copper or gold coated over the alumina.

17. The housing of claim 15 wherein the electromagnetic shield is characterized as having been contacted to the alumina window or wall by a process selected from the group consisting of plating, vapor deposition, chemical vapor deposition, and sputtering.

* * * * *